United States Patent
Takanashi et al.

(10) Patent No.: US 8,825,363 B2
(45) Date of Patent: Sep. 2, 2014

(54) PORTABLE TERMINAL, TRAVEL PATH RECORDING METHOD AND PROGRAM STORAGE MEDIUM

(75) Inventors: Takako Takanashi, Kawasaki (JP);
Makoto Saotome, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 745 days.

(21) Appl. No.: 12/320,487

(22) Filed: Jan. 27, 2009

(65) Prior Publication Data

US 2009/0271111 A1    Oct. 29, 2009

(30) Foreign Application Priority Data

Apr. 28, 2008 (JP) .................................. 2008-117246
Aug. 29, 2008 (JP) .................................. 2008-221612

(51) Int. Cl.
| | | |
|---|---|---|
| *G01C 21/34* | (2006.01) | |
| *G01C 22/00* | (2006.01) | |
| *H04M 1/725* | (2006.01) | |
| *G01C 21/20* | (2006.01) | |

(52) U.S. Cl.
CPC .............. *G01C 21/20* (2013.01); *G01C 22/006* (2013.01); *H04M 1/72572* (2013.01); *H04M 2250/10* (2013.01)
USPC ........................................................ 701/207

(58) Field of Classification Search
CPC ...... G09B 29/106; G01C 21/32; G01C 21/34; G01C 21/36; G08G 1/20
USPC ........................................................ 340/990
See application file for complete search history.

(56) References Cited

U.S. PATENT DOCUMENTS

| 6,850,844 B1 * | 2/2005 | Walters et al. ................ 701/216 |
| 2006/0136173 A1 * | 6/2006 | Case et al. ..................... 702/182 |
| 2007/0067097 A1 * | 3/2007 | Haatainen ..................... 701/208 |

FOREIGN PATENT DOCUMENTS

| JP | 10-170300 | 6/1998 |
| JP | 11-83529 | 3/1999 |
| JP | 11-339182 | 12/1999 |
| JP | 2000-227341 | 8/2000 |
| JP | 2003-14475 | 1/2003 |
| JP | 2003-121172 | 4/2003 |
| JP | 2005-249555 | 9/2005 |
| JP | 2007-24700 | 2/2007 |

OTHER PUBLICATIONS

Japanese Office Action issued Oct. 16, 2012 in corresponding Japanese Patent Application No. 2008-221612.
Japanese Office Action mailed Mar. 5, 2013 for corresponding Japanese Application No. 2008-221612.

* cited by examiner

*Primary Examiner* — Michelle L Le
(74) *Attorney, Agent, or Firm* — Staas & Halsey LLP (57) ABSTRACT

A portable terminal includes: a position obtaining section that obtains a piece of position information of a current position of the portable terminal; a power control section that controls turning on and off of power before and after the piece of position information is obtained by the position obtaining section, respectively; and a motion sensor that detects a movement of the portable terminal. The portable terminal further includes: a storage section that stores a history of the pieces of position information; and a recording section that records, into the storage section, a piece of position information newly obtained by the position obtaining section activated by the power control section, only when a movement is detected by the motion sensor.

18 Claims, 9 Drawing Sheets

| ACQUISITION NO. | LATITUDE | LONGITUDE |
|---|---|---|
| 0 (START MOVING) | X0 | Y0 |
| 1 | X1 | Y1 |
| 2 | X2 | Y2 |
| ... | ... | ... |
| n | Xn | Yn |

FIG. 6A

| LATEST MEASURED RESULT |
|---|
| Z |

PORTABLE TERMINAL, TRAVEL PATH RECORDING METHOD AND PROGRAM STORAGE MEDIUM

CROSS-REFERENCE TO RELATED APPLICATIONS

This application is based upon and claims the benefit of priority of the prior Japanese Patent Applications No. 2008-117246, filed on Apr. 28, 2008, and No. 2008-221612, filed on Aug. 29, 2008, the entire contents of which are incorporated herein by reference.

FIELD

The embodiments discussed herein are related to a portable terminal, a travel path recording method and a storage medium that stores a program for these terminal and method.

BACKGROUND

Portable telephones are equipped with, in addition to a standard telephone function and an email exchanging function, a camera function for photographing a subject, a browsing function for browsing websites, and a TV function for watching TV programs. Portable telephones have been used by people in a wide range of generations not only as a means for carrying out communications, but also as a multifunctional personalized terminal that serves as a digital camera, a personal computer, a TV and so forth. Under such circumstances, portable telephone manufactures are emulously adding new functions to their own products to make them unique.

Functions that have been newly added to recent portable telephones include a pedometer and a GPS function. For example, Japanese Laid-open Patent Publication No. 2000-227341 describes a technique for virtually displaying a travel path on a display screen according to the number of steps measured by the pedometer. When a portable telephone that is almost always carried by a user is equipped with a pedometer in this way, the user can readily know the total number of his/her steps for one day, enhancing the user's motivation for doing exercise. Also, when a portable telephone is equipped with a GPS function, it is possible to recognize the current position of a user carrying the portable telephone, enabling the portable telephone to serve as a means for preventing crimes as well as a navigation device for leading the user to destinations.

Meanwhile, since users usually carry their portable telephones when traveling, there has been devised a route recording function for recording travel paths made on a trip by using the portable telephone. Japanese Laid-open Patent Publication No. 10-170300 describes a technique for estimating the current position by calculating a travel distance between the initial position and the current position using a value obtained by a pedometer, thereby displaying the estimated current position determined based on the travel distance on a map. According to the technique described in Japanese Laid-open Patent Publication No. 10-170300, since the estimated current positions are sequentially recorded, the user can review the entire routes after retuning from the trip.

However, the above-described method for calculating the current position based on the travel distance has such a problem that an error between the predicted current position and the actual current position is large, making it impossible to obtain precise traveling paths made on the trip. In order to acquire the current position precisely, it is preferable to use a GPS function instead of using a pedometer provided in the portable telephone. However, a GPS function requires a large amount of power consumption. Therefore, when the GPS function is provided in a portable terminal with a battery of low capacity and the GPS function is kept active all the time, the battery quickly goes dead, making the portable terminal inoperable. For this reason, it is necessary to control turning on and off of the GPS function in order to suppress power consumption.

Figure 1:
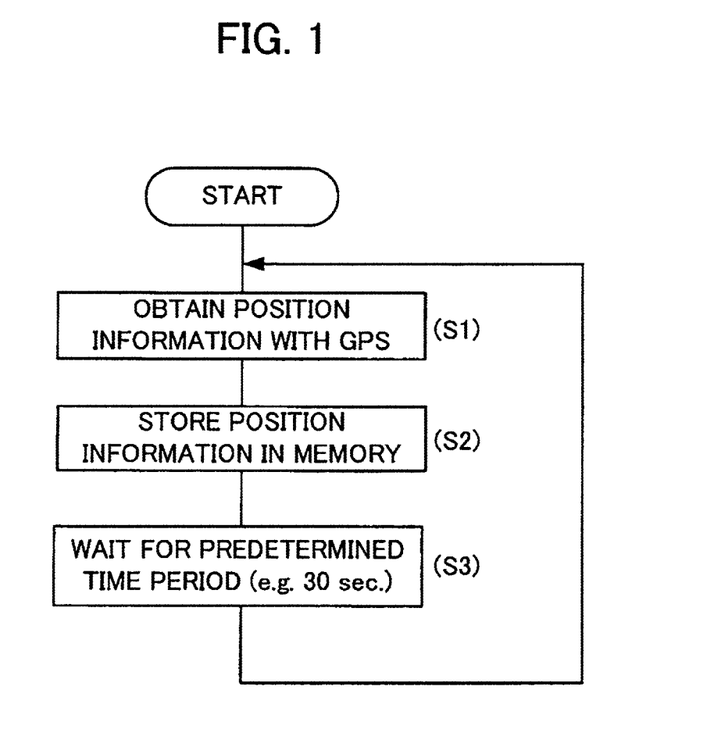
FIG. 1 is a flowchart that illustrates a flow of processes for recording a travel path using a GPS function.

FIG. 1 is a flowchart that illustrates a flow of processes for recording a travel path using a GPS function.

When a user selects a route recording function using an operation member, the GPS function of a portable telephone is activated, information representing the current position of the user is acquired, and then the GPS function is stopped (step S1 of FIG. 1). Subsequently, the information representing the current position is recorded in a memory of the portable telephone (step S2 of FIG. 1).

After a lapse of predetermined time (e. g., 30 seconds) (step S3 of FIG. 1), the GPS function is activated again and the information representing the current position of the user is acquired (step S1 of FIG. 1), and subsequently the information representing the current position is recorded in the memory (step S2 of FIG. 1).

This sequence of processes is periodically repeated until the user gives an order to halt the operation of the route recording function with an operation member.

When an order to display a travel path on a display screen is given by the user, there appears a map that indicates the travel path linking the positions represented by the position information recorded in the memory. By checking the travel path on the map displayed on the display screen, the user can reliably and readily review the routes made on a trip.

Here, according to the method illustrated in FIG. 1, the portable terminal keeps recording the information representing the current position even when the user is eating or sleeping, until the halt of the route recording function is ordered. Therefore, when the user is on a trip including stay for nights, if the GPS function is kept active in order to record all the paths made on the trip, the power of the battery is quickly used up. Besides this, a memory with a large capacity for recording a great amount of information is required. However, there is such a concern that it is difficult to provide the inside of the portable telephone with space for accommodating a large battery or a large memory with sufficient recording capacity, because downsizing of portable telephones has been rapidly promoted.

SUMMARY

A portable terminal includes:

a position obtaining section that obtains a piece of position information of a current position of the portable terminal;

a power control section that controls turning on and off of power before and after the piece of position information is obtained by the position obtaining section, respectively;

a motion sensor that detects a movement of the portable terminal;

a storage section that stores a history of the pieces of position information; and a recording section that records, into the storage section, a piece of position information newly obtained by the position obtaining section activated by the power control section, only when a movement is detected by the motion sensor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Embodiments will be described with reference to the drawings.

Figure 2:
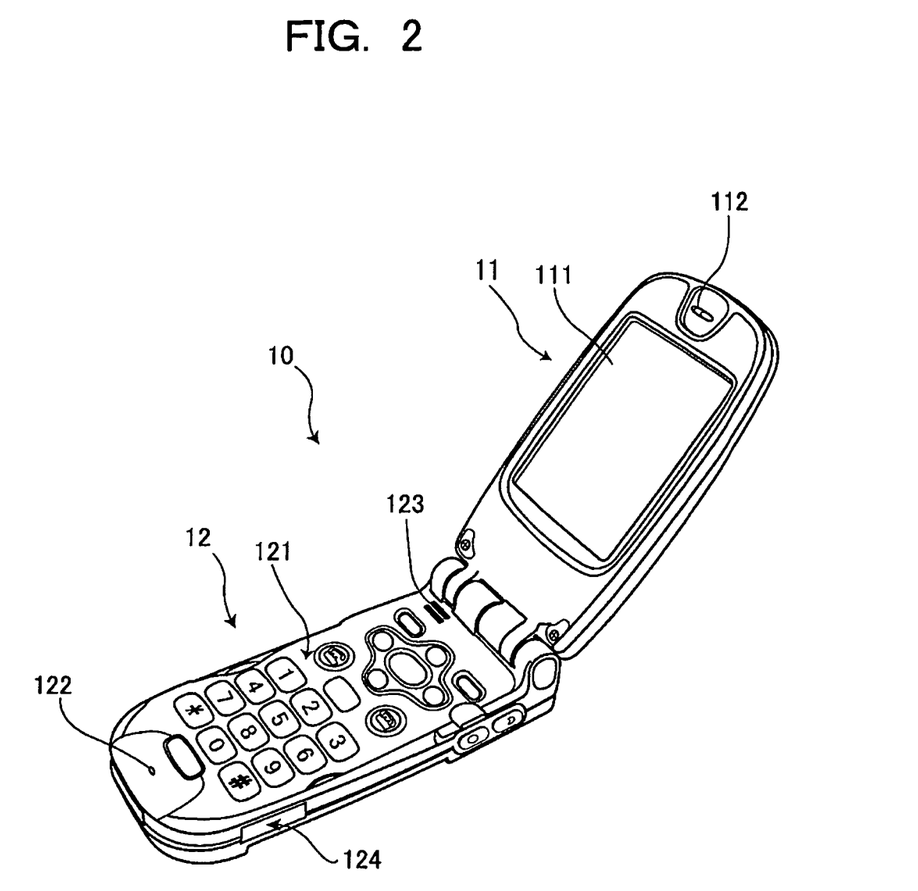
FIG. 2 is an external perspective view of a portable telephone according to a first embodiment of the portable terminal described above in SUMMARY.
Figure 3:
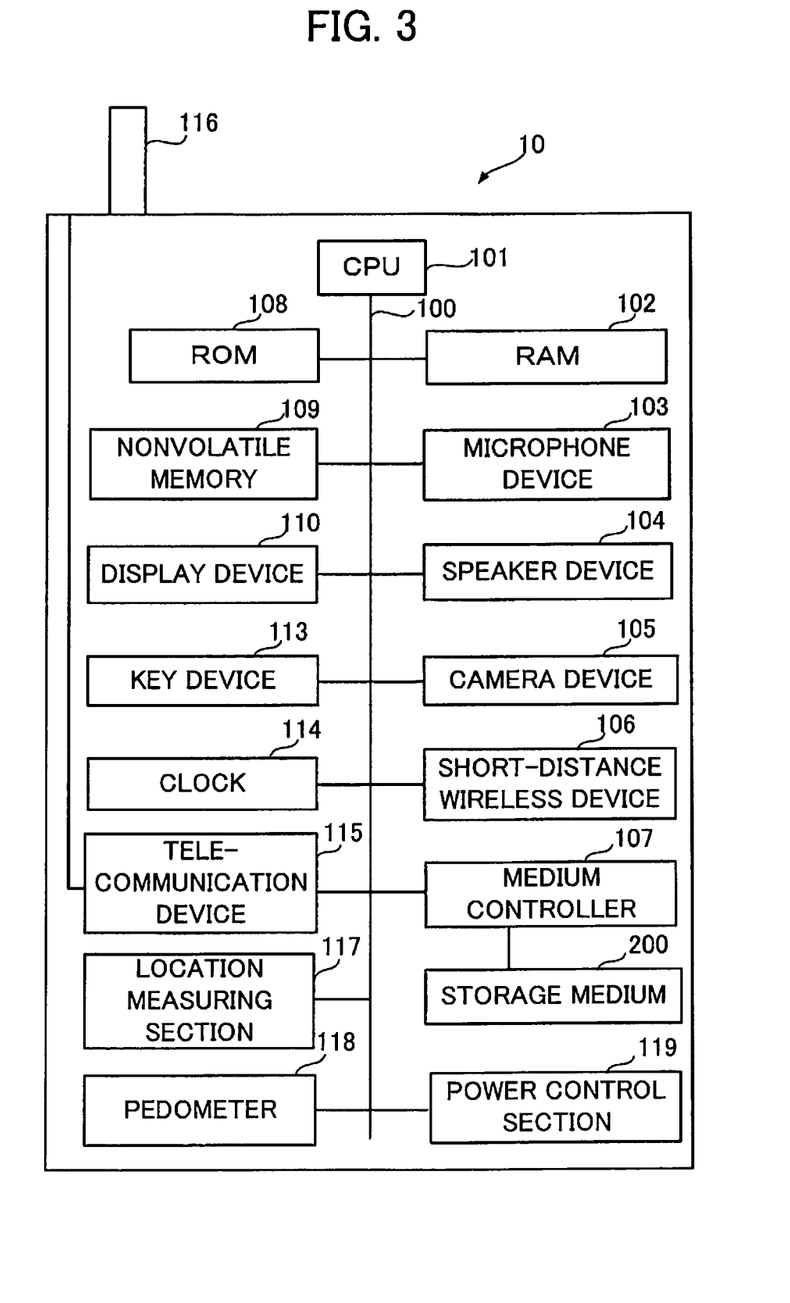
FIG. 3 is a hardware block diagram of the portable telephone.

FIG. 2 is an external perspective view of a portable telephone 10 according to a first embodiment of the portable terminal described above in SUMMARY. FIG. 3 is a hardware block diagram of the portable telephone 10.

The portable telephone 10 has a route recording function (described later) that controls a GPS function using a power control function, acquires the current position of a user, and obtains a travel path by recording a history of pieces of position information indicating the respective current positions.

As illustrated in FIG. 2, the portable telephone 10 has an upper housing 11 and a lower housing 12 openable and closable relative to each other. The upper housing 11 has a LCD 111 for displaying an image and an earpiece 112 provided with a small built-in speaker. The earpiece 112 enables the user to hear voice output from the earpiece 112 when the earpiece 112 is brought closer to or touched by an ear of the user.

The lower housing 12 has various operation keys 121 to be operated by the user. The user can make a call, send e-mail and carry out various kinds of setting by using these operation keys 121. The lower housing 12 also has a mouthpiece 122 provided with a built-in microphone for picking up the user's voice. The mouthpiece 122 collects and guides voice to the microphone. The lower housing 12 further has a sound outlet 123 provided with a built-in speaker and capable of outputting sound whose volume is large enough to be heard by the user even when the portable telephone 10 is away from an ear of the user. Furthermore, the lower housing 12 has a loading aperture 124 for loading a recording medium.

FIG. 3 illustrates: a, CPU 101, a RAM 102, a microphone device 103, a speaker device 104, a camera device 105, a short-distance wireless device 106, a medium controller 107, a ROM 108, a nonvolatile memory 109, a display device 110, a key device 113, a clock 114, a telecommunication device 115, an antenna 116, a position measuring section 117, and a pedometer 118, and a power control section 119. All these elements except for the antenna 116 are connected to one another through a bus 100.

The CPU 101 serves as an example of a computer, has functions to execute various programs, and controls the entire portable terminal 10.

The ROM 108 stores various programs and various constants necessary for the execution of these programs by the CPU 101. The CPU 101 executes the programs stored in the ROM 108 while using the RAM 102 as a working area.

The nonvolatile memory 109 stores various kinds of rewritable information such as an address book or received electronic mail. In the nonvolatile memory 109, a history of pieces of position information representing the respective current positions of the user is also stored during execution of the route recording function (described later). The combination of the CPU 101 and the nonvolatile memory 109 is an example of the storage section in the portable terminal described in SUMMARY.

The microphone device 103 is a functional block that represents the microphone for picking up the user's voice and processes the voice picked up by the microphone.

The speaker device 104 is a functional block that represents the speakers for emitting sound to the user and generates sound signals for driving the speakers.

The short-distance wireless device 106 is an element that transmits an image and a telephone number to an external device at a short distance without using a base station. In the present embodiment, infrared-ray communication is employed.

The camera device 105 is a block that controls collection of image data obtained by shooting images. The display device 110 is a block that controls display of image on the LCD 111 (cf. FIG. 2). The key device 113 is a block that detects the user's operations of the operation keys 121 (cf. FIG. 2). The clock 114 is a block that acquires the current time. The combination of the display device 110 and the LCD 111 is an example of the map display section of the portable terminal described in SUMMARY.

The medium controller 107 is an element that reads data from a storage medium 200 loaded into the loading aperture 124 illustrated in FIG. 2, and writes image data generated by the camera device 105 into the storage medium 200.

The telecommunication device 115 transmits and receives audio data and electronic mail using the antenna 116. The telecommunication device 115 carries out transmission and reception of data through a base station.

The power control section 119 carries out power supply control of each function, thereby controlling and reducing power consumption of the portable telephone 10. This power supply control is an example of "turning on and off of power" related to the position obtaining section in the portable terminal described in SUMMARY. For example, the power control section 119 activates the position measuring section 117 by supplying power to the position measuring section 117, and halts the operation of the position measuring section 117 by stopping power supply to the position measuring section 117.

The position measuring section 117 is a block that acquires position information representing the current position of the portable telephone 10 using a GPS system. The pedometer 118 is a block that measures the number of steps of the user carrying the portable telephone 10, by detecting acceleration in the movement of the portable telephone 10. The position measuring section 117 is an example of the position obtaining section and the pedometer 118 is an example of the motion sensor of the portable terminal described in SUMMARY.

The portable telephone 10 is configured as described above in terms of appearance and hardware.

Subsequently, the route recording function for which power supply control is carried out will be described in detail.

Figure 4:
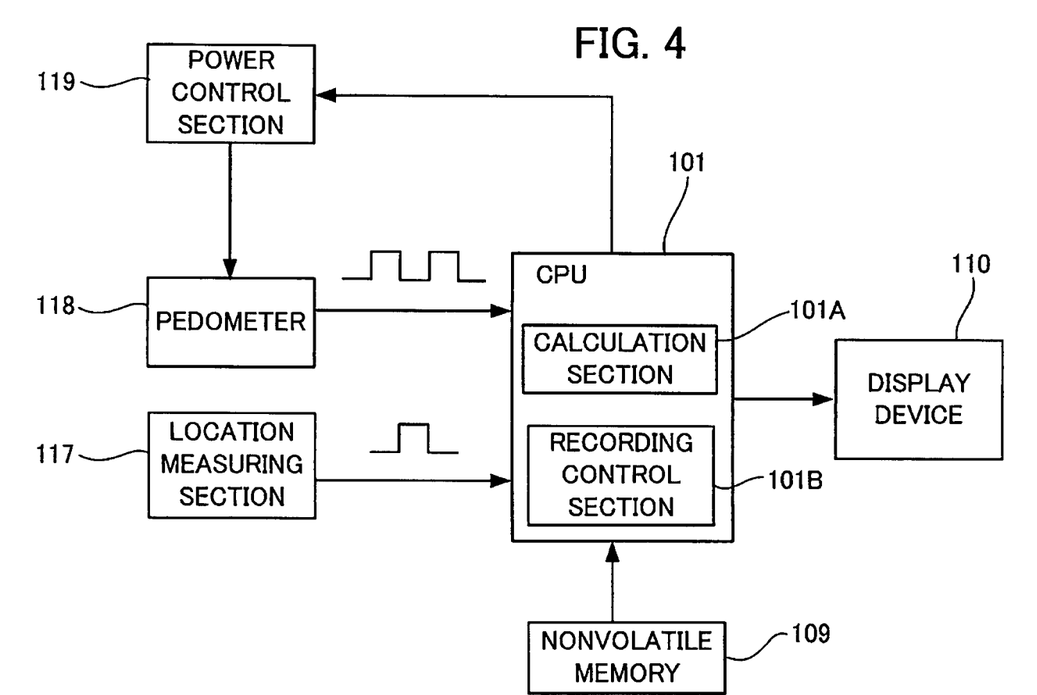
FIG. 4 is a diagram illustrating elements necessary for a route recording function.
Figure 5:
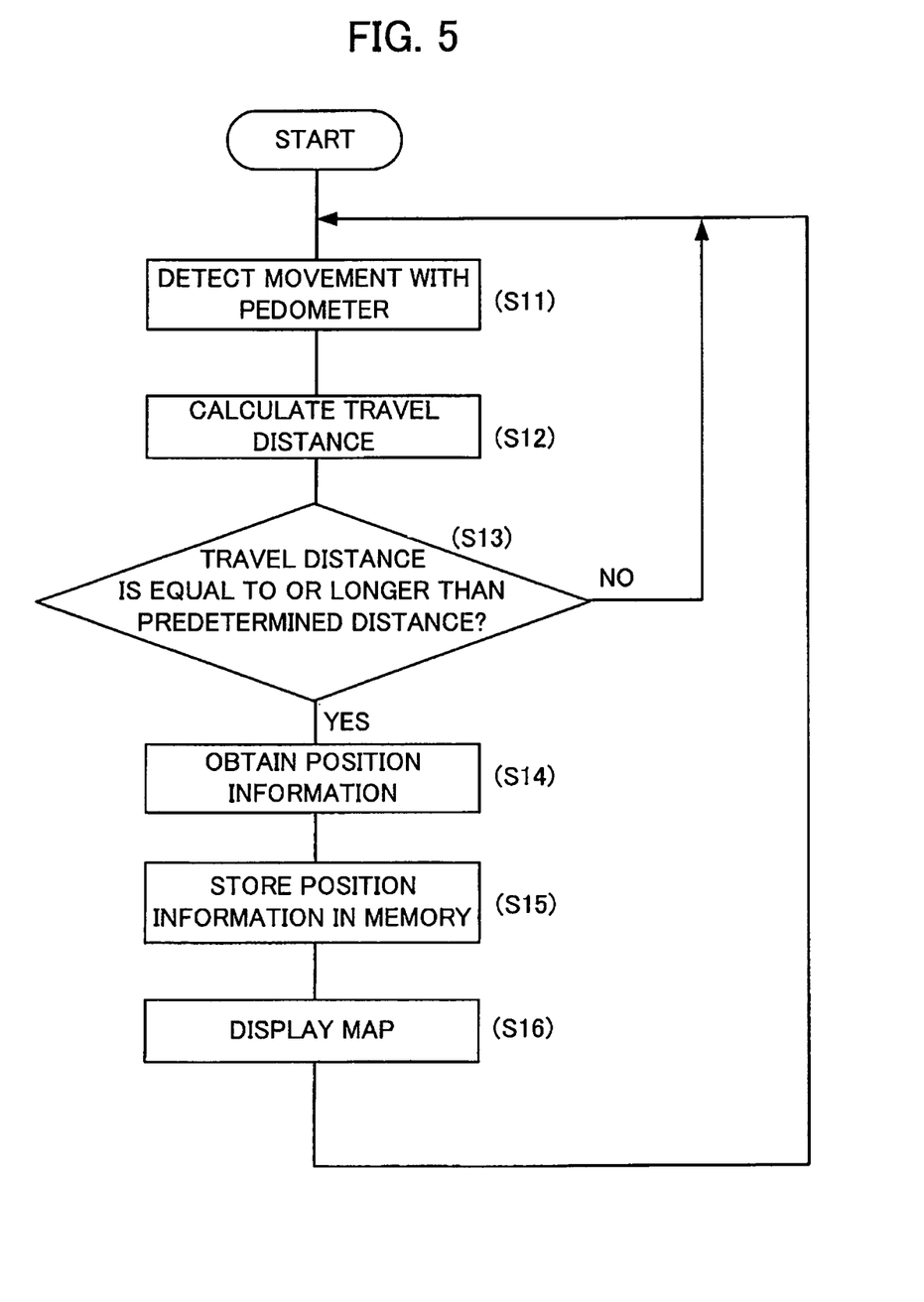
FIG. 5 is a flowchart illustrating the flow of a series of processes carried out by the route recording function.

FIG. 4 is a diagram illustrating elements necessary for the route recording function for which power supply is controlled, and FIG. 5 is a flowchart illustrating the flow of a series of processes carried out by the route recording function for which power supply is controlled.

As illustrated in FIG. 4, the CPU 101 includes a calculation section 101A that calculates a travel distance based on a measurement result obtained by the pedometer 118. The CPU 101 also includes a recording control section 101B that controls recording of obtained position information into the nonvolatile memory 109 by causing the power control section 119 to control the activation and deactivation of the position measuring section 117. The recording control section 101B is an example of the recording section in the portable terminal described in SUMMARY.

Now, the flow of a series of processes in the route recording function illustrated in FIG. 5 will be described, which will also serve as descriptions of various components illustrated in FIG. 4.

When the user orders execution of the route recording function using the operation keys 121 illustrated in FIG. 2, information representing the order is transmitted to the CPU 101, thereby starting the route recording function. First, the power control section 119 activates the position measuring section 117, and position information representing the current position of the portable telephone 10 is acquired by the position measuring section 117 using the GPS system. The acquired position information is recorded into the nonvolatile memory 109 as position information that represents the starting point of movement. Also, the initial value (the number of steps is "0") is recorded into the nonvolatile memory 109 as a measurement value obtained by the pedometer 118.

In the portable telephone 10, acceleration in movement of the portable telephone 10 is detected by the pedometer 118, the number of steps of the user is determined based on the detected acceleration. When the user moves while carrying the portable telephone 10, the number of steps representing movement of the user is measured by the pedometer 118 and the result obtained by the measurement is output to the CPU 101 (step S11 in FIG. 5).

It is preferable that the motion sensor of the portable terminal described in SUMMARY is a pedometer that measures the number of steps of the user carrying the portable terminal, by detecting acceleration of the portable terminal.

By providing the portable terminal with a pedometer widely used, it is possible to readily and reliably detect movement of the user. The pedometer 118 described in the present embodiment is an example of the pedometer of the portable terminal described in SUMMARY.

Meanwhile, the calculation section 101A of the CPU 101 illustrated in FIG. 4 acquires the previous measurement result stored in the nonvolatile memory 109 upon receipt of the current measurement result representing the number of steps from the pedometer 118. The current measurement result and the previous measurement result (in this example, the initial value "0") are compared with each other, and a travel distance is determined (step S12 in FIG. 5). In the present embodiment, the difference between the current measurement result and the previous measurement result is determined as a travel distance. Acquisition of a measurement result from the pedometer 118 (step S11) and determination of the travel distance (step S12) continue until the travel distance reaches a length equivalent to the predetermined number of steps (step S13 in FIG. 5: No).

When the travel distance reaches the length equivalent to the predetermined number of steps (step S13 in FIG. 5: YES), the recording control section 101B overwrites the previous measurement result obtained by the pedometer 118 and stored in the nonvolatile memory 109 with the newly obtained current measurement result. Subsequently, in accordance with a command from the recording control section 101B, the power control section 119 activates the position measuring section 117 through the CPU 101, and position information representing the current position of the portable telephone 10 is obtained by the position measuring section 117 (using GPS system). Then, the power control section 119 deactivates the position measuring section 117 (step S14 in FIG. 5). In other words, in this step S14, the position measuring section 117 is activated before position information is acquired by the position measuring section 117, and the position measuring section 117 is deactivated after the position information is acquired by the position measuring section 117. The acquired position information is additionally stored in the nonvolatile memory 109 (step S15 in FIG. 5).

FIG. 6 is a conceptual diagram that illustrates information recorded into the nonvolatile memory 109.

Figure 6A:
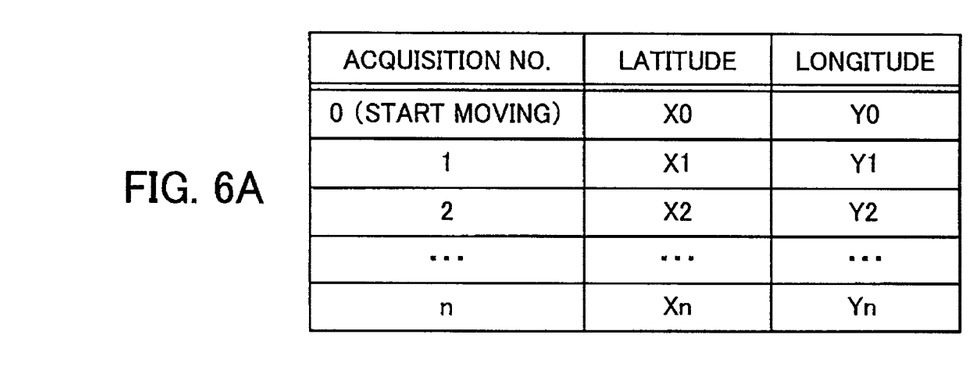
FIG. 6 is a conceptual diagram that illustrates information recorded into a nonvolatile memory.
Figure 6B:
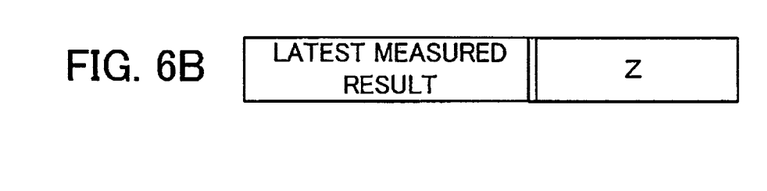

As illustrated in FIG. 6A, a history of pieces of position information acquired by the position measuring section 117 controlled by the power control section 119 is recorded into to the nonvolatile memory 109, so that the pieces of position information are sequentially recorded in the order of acquisition. Also as illustrated in FIG. 6B, the measurement result stored in the nonvolatile memory 109 is overwritten with the latest result obtained by the pedometer 118. In this way, since the power control section 119 activates the position measuring section 117 to acquire position information only when a measured value is output from the pedometer 118, acquiring and recording of position information are stopped when the user is not moving. Accordingly, it is possible to reliably record travel paths of the user while reducing load and power consumption required for processing and thereby suppressing an increase in usage of the memory.

When display of the travel path is ordered by the user, the history of pieces of position information recorded into the nonvolatile memory 109 is sent to the display device 110, so that a map where positions corresponding to the respective acquired pieces of position information are plotted is displayed on the LCD 111 (step S16 in FIG. 5).

As described above, each time a movement is detected by the pedometer 118 (step S11 in FIG. 5), a travel distance (the difference in the number of steps measured by the pedometer 118) between the previously acquired position information and the currently acquired position information is calculated (step S12 in FIG. 5). Subsequently, when the travel distance is equal to or longer than the predetermined distance (step S13 in FIG. 5: YES), the GPS function is activated and a piece of position information representing the current position is acquired (step S14 in FIG. 5), and the acquired piece of position information is additionally stored in the nonvolatile memory 109 (step S15 in FIG. 5). This sequence of processes is repeatedly executed until the user gives an order to stop recording the travel path.

Here, it is preferable that the recording section of the portable terminal described in SUMMARY activates and causes the position obtaining section to acquire a piece of position information representing the current position upon detection of a movement by the motion sensor, stops the position obtaining section after acquiring the piece of position information representing the current position, and refers to the latest piece of position information stored in the storage section. With this preferable control, it is possible to reduce power consumption thereby saving the power in the battery. It is further preferable that the portable terminal described in SUMMARY further includes a distance calculation section that calculates a travel distance between the position represented by the latest position information and the current position, and only when the distance calculated by the distance calculation section is equal to or longer than a predetermined distance, the piece of position information representing the current position acquired by the position obtaining section is stored in the storage section.

If the piece of position information representing the current position acquired by the position obtaining section is stored in the storage section only when the distance calculated by the distance calculation section is equal to or longer than the predetermined distance, it is possible to surely suppress an increase in the capacity of a memory.

Subsequently, the history of pieces of position information recorded into the nonvolatile memory 109 is sent to the display device 110 when the user gives an order to display the travel path. The display device 110 forms a travel path by linking the positions represented by the pieces of position information and displays a map illustrating the travel path on the LCD 111.

Figure 7:
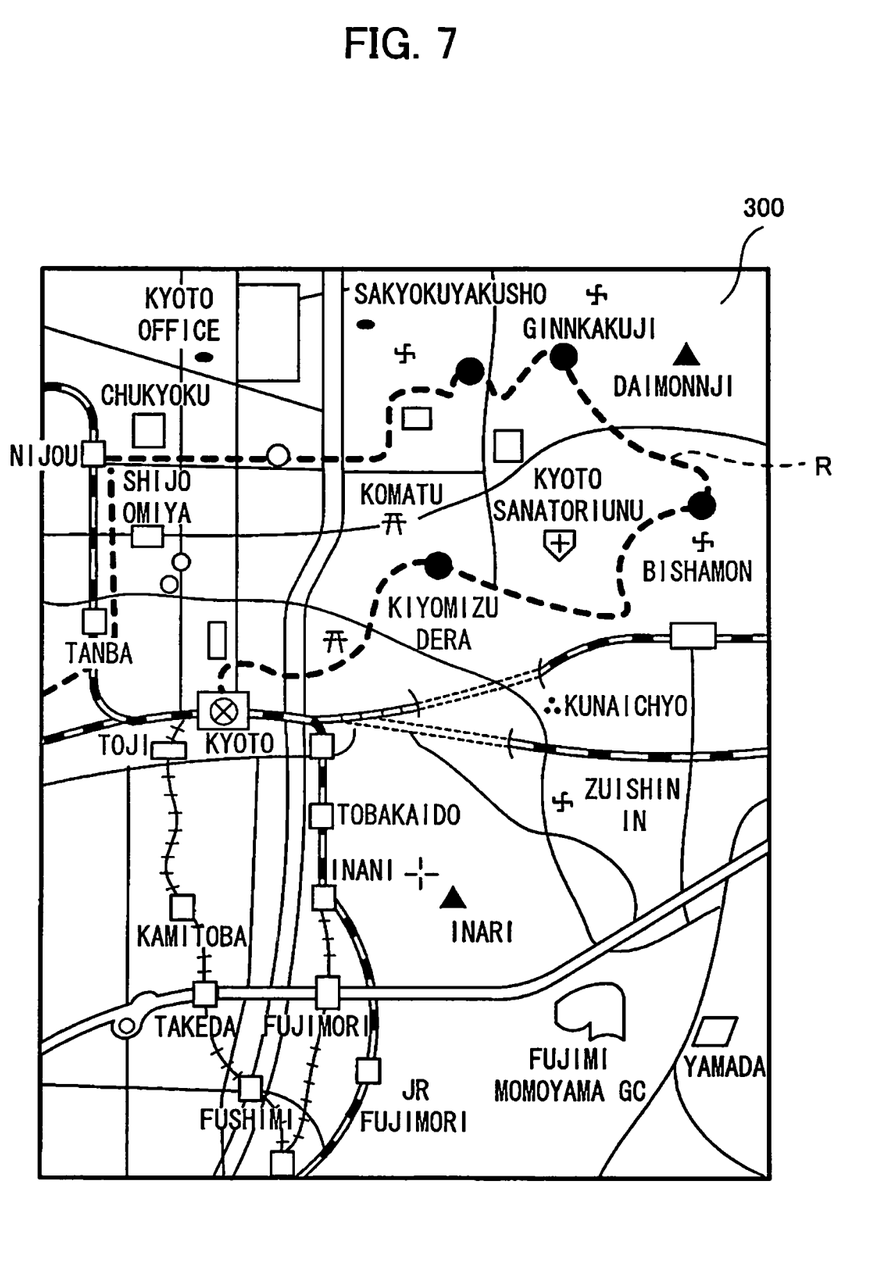
FIG. 7 is a diagram that illustrates an example of a map displayed on an LCD.

FIG. 7 is a diagram that illustrates an example of the map displayed on the LCD 111.

As illustrated in FIG. 7, a map 300 using map information is displayed on the LCD 111. On the map 300, a travel path R formed by sequentially connecting the positions represented by the pieces of position information that have been acquired and recorded into the nonvolatile memory 109, in the order of the acquisition of position information. By looking at the travel path R on the map 300, the user can readily check the route on a travel.

In this way, according to the portable telephone 10 of the present embodiment, only when a movement of the user is detected by the pedometer 118, the GPS system is activated and the current position of the user is acquired and recorded. Accordingly, when the user is not moving, for example, to sleep or eat, the GPS system is deactivated, and acquisition and recording of position information are halted. Therefore, it is possible to reliably record travel paths while suppressing power consumption thereby preventing load and memory capacity from increasing.

In the present embodiment, position information acquired by the position measuring section 117 is used to display travel paths on a map. However, the position information may be saved in other memory, transmitted to an external device, or utilized for executing other functions of the portable telephone 10.

This concludes the description of the first embodiment and subsequently, a second embodiment will be described. The second embodiment of the portable terminal described above in SUMMARY has a structure similar to that of the first embodiment. However, the second embodiment is different from the first embodiment in terms of timing for executing processes in a pedometer and a position measuring section. For his reason, FIG. 3 and FIG. 4 will also be used in describing the second embodiment, and only the features different from the first embodiment will be described.

A portable telephone of the present embodiment is configured in a manner similar to the portable telephone of the first embodiment illustrated in FIG. 4, but the timing for processing in the pedometer 118 and the position measuring section 117 controlled by the recording control section 101B as well as the timing for processing in the calculation section 101A are different from those in the first embodiment.

Figure 8:
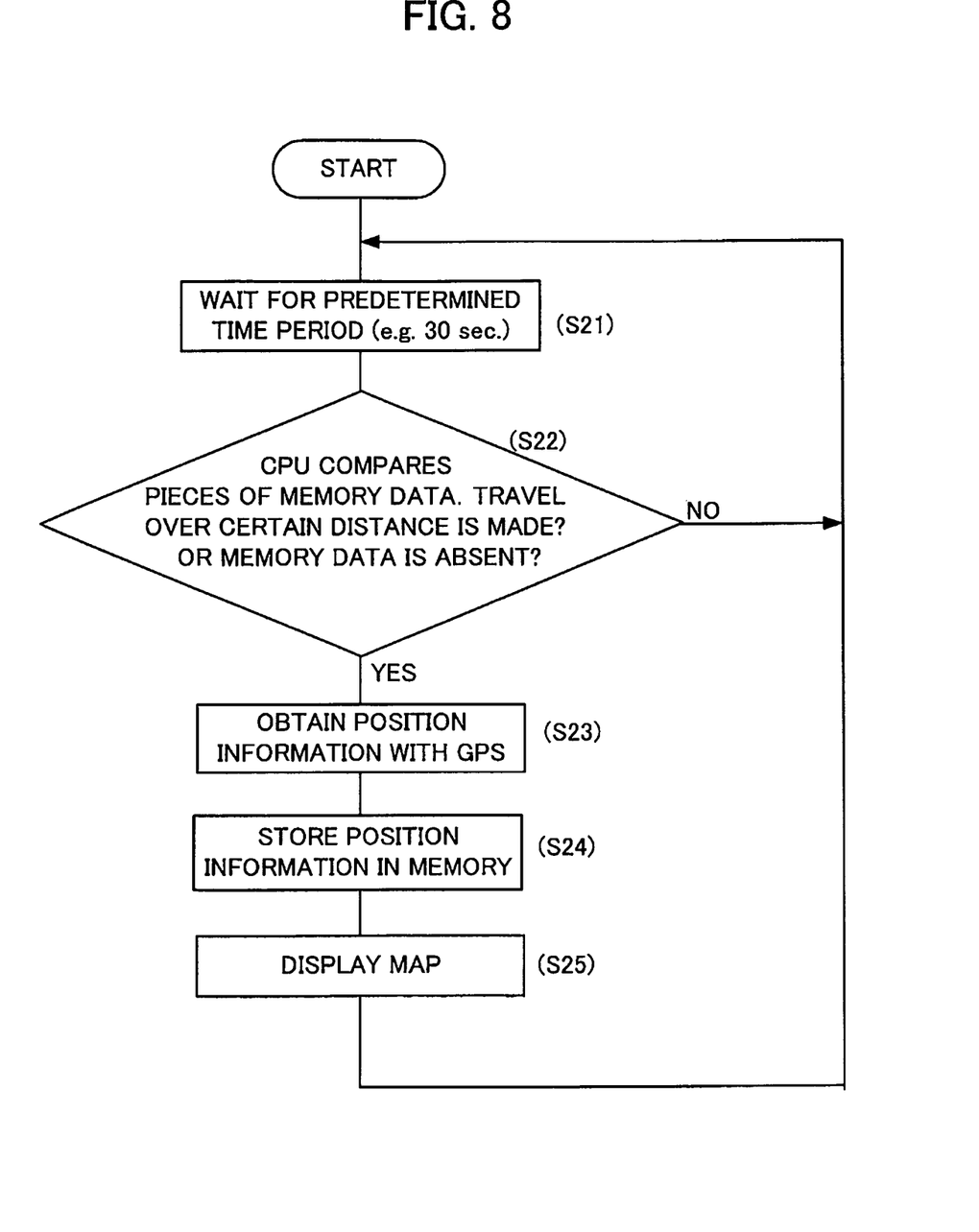
FIG. 8 is a flowchart which illustrates the flow of a series of processes executed in a route recording function of the portable telephone according to a second embodiment.

FIG. 8 is a flowchart that illustrates the flow of a series of processes executed in a route recording function of the portable telephone according to the second embodiment.

When the route recording function is started in response to an order given by a user, output of a measurement result from the pedometer 118 is awaited for a predetermined period of time (here, 30 seconds) (step S21 in FIG. 8).

The absence of output of a measurement result from the pedometer 118 means that the user is not moving (step S22 in FIG. 8: NO). Again, output of a measurement result from pedometer 118 is awaited for a certain period of time (step S21 in FIG. 8). These steps are repeated until when a measurement result is output from the pedometer 118 (step S22 in FIG. 8: YES).

When a measurement result is output from the pedometer 118 (step S22 in FIG. 8: YES), the power control section 119 activates the position measuring section 117, position information representing the current position of the portable telephone 10 is acquired (step S23 in FIG. 8). Subsequently, the acquired position information is recorded into the nonvolatile memory 109 as a movement starting point (step S24 in FIG. 8). When the position information is recorded, a map where a travel path represented by a history of the recorded pieces of position information is displayed on the LCD 111 (step S25 in FIG. 8).

The portable telephone of the second embodiment detects a movement with the pedometer 118 at predetermined time intervals. Only when a movement is detected, activation of the position measuring section 117, acquisition of position information, deactivation of the position measuring section 117, saving of the position information, and display of the position information are performed. When a movement is not detected by the pedometer 118 within the time interval, these processes are not carried out. In this way, since a piece of position information representing the present position is acquired only when the user moves, the frequency of accessing the GPS system can be reduced and thus power consumption of the portable telephone 10 can be suppressed. Also, since an amount of position information to be acquired can be reduced, it is possible to suppress a memory increase.

This concludes the description of the second embodiment and subsequently, a third embodiment will be described. The third embodiment of the portable terminal described above in SUMMARY has a structure similar to that of the first embodiment. Therefore, FIG. 3 and FIG. 4 will also be used in describing the third embodiment, and only the features different from the first embodiment will be described.

Figure 9:
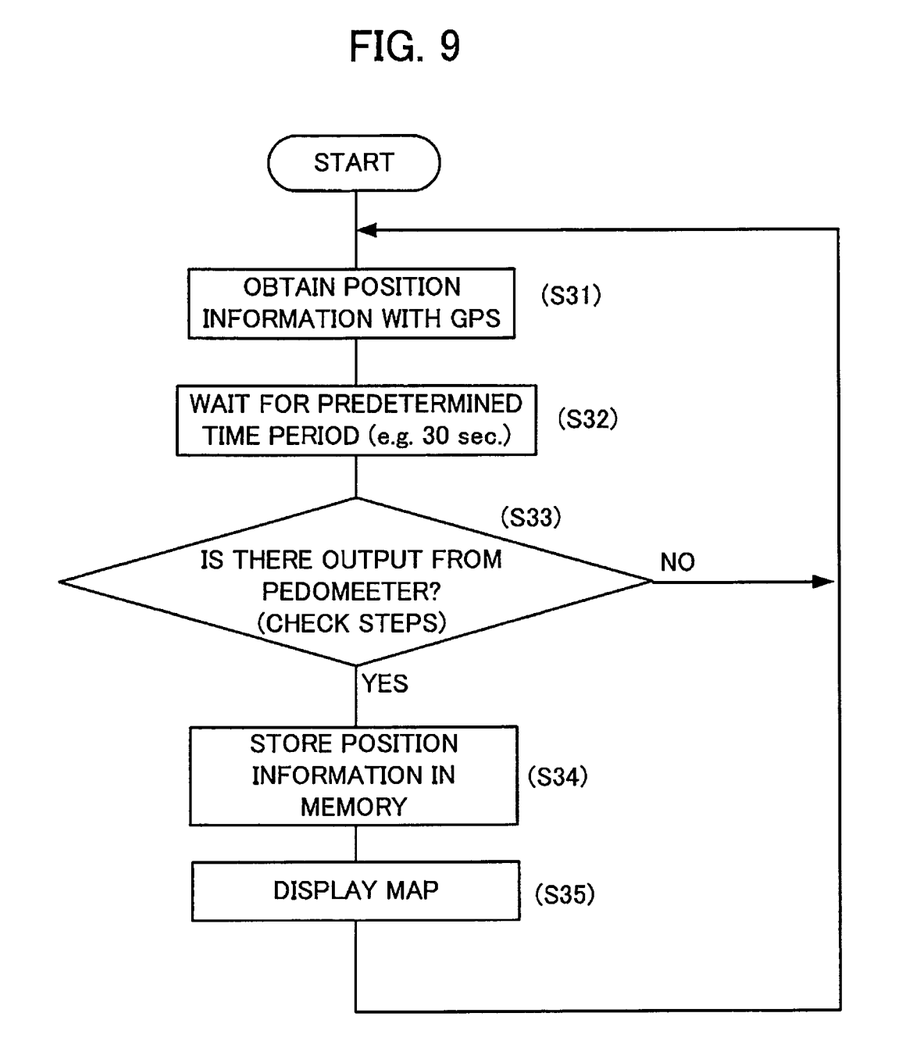
FIG. 9 is a flowchart which illustrates the flow of a series of processes executed in a route recording function of a portable telephone according to a third embodiment.

FIG. 9 is a flowchart that illustrates the flow of a series of processes executed in a route recording function of a portable telephone according to the third embodiment.

When the route recording function is started in response to an order given by a user, the power control section 119 controls the position measuring section 117 to acquire a piece of position information representing the current position of the portable telephone 10 (step S31 in FIG. 9) and the acquired piece of position information is recorded into the nonvolatile memory 109 as a movement starting position.

When the piece of position information is acquired by the position measuring section 117, output of a measurement result from the pedometer 118 is awaited for a certain period of time (here, 30 seconds) (step S32 in FIG. 9).

Absence of output of a measurement result from the pedometer 118 (step S33 in FIG. 9: NO) means that the user is not moving. Again, a piece of position information is acquired by the position measuring section 117 (step S31 in FIG. 9), and output of a measurement result from the pedometer 118 is awaited for a certain period of time (step S32 in FIG. 9). These steps are repeated until a measurement result is output from the pedometer 118 (step S33 in FIG. 9: YES).

When a measurement result is output from the pedometer 118 (step S33 in FIG. 9: YES), the latest piece of position information acquired by the position measuring section 117 is recorded into the nonvolatile memory 109 (step S34 in FIG. 9), and a map where a travel path represented by a history of the recorded pieces of position information is displayed on the LCD 111 (step S35 in FIG. 9).

In the present embodiment, the GPS function is activated and a piece of position information representing the current position is acquired at every intervals and thus, the third embodiment is inferior to the first embodiment and the second embodiment in terms of power saving. However, since a piece of position information representing the present position is recorded only when the user moves, it is possible to reliably record travel paths while suppressing an increase in memory capacity.

Here, a portable telephone is used as an example of the portable terminal described in SUMMARY, but the portable terminal may be any type of device such as a Personal Digital Assistant (PDA) and a portable gaming machine.

Also, a pedometer is used as an example of the motion sensor of the portable terminal described in SUMMARY, but the motion sensor may be an acceleration sensor that detects movement acceleration of the portable terminal. When an acceleration sensor is employed as the motion sensor, a travel distance can be calculated by integrating, twice, acceleration measured by the acceleration sensor. Also, in recent years, a three-dimensional acceleration sensor which can measure acceleration in up, down, left and right directions has been used. By employing such a multidirectional-acceleration detecting type of acceleration sensor, it is possible to calculate a travel distance in each direction.

Also, there have been described examples in which a piece of position information is acquired and recorded only when a travel distance (the number of steps) between the position represented by the previously recorded piece of position information and the current position is equal to or longer than a predetermined distance. However, for example, a piece of position information may be acquired only when a movement is detected by a motion sensor and then, the acquired piece of position information may be recorded only when a travel distance reaches a predetermined distance.

According to the portable apparatus described in SUMMARY, a piece of position information that represents the current position of the portable apparatus is acquired only when a movement of the portable terminal is detected. In other words, acquisition of a piece of position information and additional recording of the piece of position information into the storage medium are not carried out when a movement of the portable apparatus is not detected while, for example, a user is eating or sleeping. Accordingly, it is possible to reliably record travel paths during a trip or the like, while reducing consumption of the power in a battery without requiring a large capacity memory.

According to the portable apparatus, travel path recording method and program storage medium in the above-described embodiments, it is possible to reliably record travel paths during a trip or the like while reducing a waste of power in a battery without requiring a large capacity memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A portable terminal comprising:
a processor configured to operate with the portable terminal that includes:
a position obtaining section that uses a GPS function and that obtains a piece of position information of a current position of the portable terminal;
a power control section that controls turning on and off of power before and after the piece of position information is obtained by the position obtaining section, respectively;
a pedometer that detects a movement of the portable terminal;
a storage section that stores a history of the pieces of position information; and
a recording section that records, into the storage section, a piece of position information newly obtained by the position obtaining section activated by the power control section, only when a movement is detected by the pedometer, and
wherein the pedometer determines whether a travel distance is longer than a predetermined distance and when the pedometer determines that the travel distance is longer than the predetermined distance, the recording section causes the power control section to activate the position obtaining section to record the obtained piece of position information in the storage section, and to turn off power to the position obtaining section.

2. The portable terminal according to claim 1, comprising:
a map display section that displays a map in which a travel path is formed by linking positions represented by respective pieces of position information stored in the storage section.

3. The portable terminal according to claim 1, wherein the power control section controls activation and deactivation of each function, and controls power supply to the position obtaining section such that the position obtaining section is not constantly activated and activated only when a piece of position information is obtained.

4. The portable terminal according to claim 1, wherein in response to detection of a movement by the pedometer, the recording section causes the power control section to activate the position obtaining section so that the position obtaining section obtains a piece of position information representing the current position and to deactivate the position obtaining section after the piece of position information representing the current position is obtained by the position obtaining section,
the portable terminal further comprises a distance calculation section that refers to the latest position information stored in the storage section, and calculates a travel distance between the position represented by the latest piece of position information and the current position, and
the recording section records the piece of position information representing the current position obtained by the position obtaining section into the storage section, only when the travel distance calculated by the distance calculation section is equal to or longer than a predetermined distance.

5. The portable terminal according to claim 1, wherein the recording section causes the position obtaining section to obtain a new piece of position information at predetermined time intervals, and the recording section records the obtained new piece of position information into the storage section when a movement is detected by the pedometer.

6. The portable terminal according to claim 1, wherein a series of processes including power-on, acquisition of position information, power-off, storage of the position information and display is carried out at predetermined time intervals, but the series of processes is not carried when a movement is not detected by the pedometer within the time interval.

7. The portable terminal according to claim 1, wherein the pedometer detects acceleration of the portable terminal, thereby measuring a number of steps of a user carrying the portable terminal.

8. The portable terminal according to claim 1, further comprising a map display section that displays a map in which a travel path is formed by linking positions represented by pieces of position information stored in the storage section.

9. A method of recording a travel path of a portable terminal including a pedometer that detects a movement, a position obtaining section that obtains a piece of position information representing a current position, a power control section that uses a GPS function and that controls the position obtaining section, and a storage section that stores a history of pieces of position information, the method comprising:
  detecting a movement of the portable terminal with the pedometer;
  obtaining a piece of position information of the current position of the portable terminal, by causing the power control section to activate the position obtaining section every time a movement of the portable terminal is detected in the detecting; and
  recording a piece of position information newly obtained in the obtaining into the storage section, and
  determining, using the pedometer, whether a travel distance is longer than a predetermined distance, and
  wherein when the pedometer determines that the travel distance is longer than the predetermined distance, the obtained piece of position information is stored in the storage section, and power to the position obtaining section is turned off.

10. The method according to claim 9, comprising:
  displaying a map in which a travel path is formed by linking positions represented by respective pieces of position information stored in the storage section.

11. The method according to claim 9, wherein the obtaining is a process for obtaining, in response to detection of a movement by the pedometer, a piece of position information representing the current position, in which the obtaining section is activated only at the time of the obtaining, and
  the recording comprises: calculating a travel distance between a position represented by the latest position information and the current position by referring to the latest position information stored in the storage section, and recording the position information representing the current position obtained in the obtaining into the storage section only when the travel distance calculated in the calculating is equal to or longer than a predetermined distance.

12. The method according to claim 9, wherein the obtaining is a process for obtaining a new piece of position information at predetermined time intervals, and the position obtaining section is activated only at the time of the obtaining, and
  the recording is a process for recording the new piece of position information obtained in the obtaining when a movement is detected by the pedometer.

13. The method according to claim 9, wherein the pedometer detects acceleration of the portable terminal, thereby measuring a number of steps of a user carrying the portable terminal.

14. A non-transitory storage medium that stores a program for recording a travel path of a portable terminal including a pedometer that detects a movement, a position obtaining section that obtains a piece of position information representing a current position, a power control section that uses a GPS function and that controls the position obtaining section, and a storage section that stores a history of pieces of position information, the program causing a computer to execute:
  detecting a movement of the portable terminal with the pedometer;
  obtaining a piece of position information of the current position of the portable terminal, by causing the power control section to activate the position obtaining section every time a movement of the portable terminal is detected in the detecting; and
  recording a piece of position information newly obtained in the obtaining into the storage section, and
  determining, using the pedometer, whether a travel distance is longer than a predetermined distance, and
  wherein when the pedometer determines that the travel distance is longer than the predetermined distance, the obtained piece of position information is stored in the storage section, and power to the position obtaining section is turned off.

15. The non-transitory storage medium according to claim 14, wherein the program causes the computer to further execute:
  displaying a map in which a travel path is formed by linking positions represented by respective pieces of position information stored in the storage section.

16. The non-transitory storage medium according to claim 14, wherein the obtaining is a process for obtaining, in response to detection of a movement by the pedometer, a piece of position information representing the current position, in which the obtaining section is activated only at the time of the obtaining, and
  the recording comprises: calculating a travel distance between a position represented by the latest position information and the current position by referring to the latest position information stored in the storage section, and recording the position information representing the current position obtained in the obtaining into the storage section only when the travel distance calculated in the calculating is equal to or longer than a predetermined distance.

17. The non-transitory storage medium according to claim 14, wherein the obtaining is a process for obtaining a new piece of position information at predetermined time intervals, and the position obtaining section is activated only at the time of the obtaining, and
  the recording is a process for recording the new piece of position information obtained in the obtaining when a movement is detected by the pedometer.

18. The non-transitory storage medium according to claim 14, wherein the pedometer detects acceleration of the portable terminal, thereby measuring a number of steps of a user carrying the portable terminal.

* * * * *